(12) United States Patent
Haidar et al.

(10) Patent No.: US 11,578,410 B2
(45) Date of Patent: Feb. 14, 2023

(54) THERMOCHEMICAL SYNTHESIS OF METALLIC PIGMENTS

(71) Applicant: D-BLOCK COATING PTY LTD, Kogarah (AU)

(72) Inventors: Jawad Haidar, Kogarah (AU); Sabaratnasingham Gnanarajan, Baulkham Hills (AU)

(73) Assignee: D-BLOCK COATING PTY LTD., Kogarah (AU)

( * ) Notice: Subject to any disclaimer, the term of this patent is extended or adjusted under 35 U.S.C. 154(b) by 0 days.

(21) Appl. No.: 17/293,933

(22) PCT Filed: Nov. 16, 2018

(86) PCT No.: PCT/AU2018/051227
§ 371 (c)(1),
(2) Date: May 14, 2021

(87) PCT Pub. No.: WO2019/095016
PCT Pub. Date: May 23, 2019

(65) Prior Publication Data
US 2021/0355585 A1 Nov. 18, 2021

(30) Foreign Application Priority Data

Nov. 16, 2017 (AU) ................................ 2017904642

(51) Int. Cl.
| | | |
|---|---|---|
| C23C 24/08 | (2006.01) | |
| B22F 1/07 | (2022.01) | |
| B22F 1/17 | (2022.01) | |
| B22F 1/054 | (2022.01) | |

(52) U.S. Cl.
CPC ............ *C23C 24/087* (2013.01); *B22F 1/054* (2022.01); *B22F 1/07* (2022.01); *B22F 1/17* (2022.01)

(58) Field of Classification Search
CPC ............................... C23C 24/087; B22F 1/025
See application file for complete search history.

(56) References Cited

U.S. PATENT DOCUMENTS

| | | | | |
|---|---|---|---|---|
| 4,363,832 A | | 12/1982 | Odawara | |
| 4,852,789 A | * | 8/1989 | Pond, Sr. | ............... B23K 23/00 228/198 |
| 4,927,464 A | * | 5/1990 | Cowie | ................... C09C 1/3692 106/436 |
| 2013/0082221 A1 | * | 4/2013 | Aguiar | .................. C23C 16/308 427/213 |

FOREIGN PATENT DOCUMENTS

| | | |
|---|---|---|
| GB | 568786 A | 4/1945 |
| JP | S56-150190 A | 11/1981 |
| JP | H02-088778 A | 3/1990 |
| WO | 2017219077 A1 | 12/2017 |

OTHER PUBLICATIONS

International Search Report and Written Opinion for International Application No. PCT/AU2018/051227, dated Jan. 30, 2019, 9 pages.
International Preliminary Report on Patentability for International Application No. PCT/AU2018/051227, dated Mar. 6, 2020, 5 pages.
Office Action received for Japanese Application No. 2021-5263625, dated Feb. 8, 2022, 4 Pages including 2 pages of English translation.

* cited by examiner

*Primary Examiner* — Tabatha L Penny
(74) *Attorney, Agent, or Firm* — EcoTech Law Group, P.C.

(57) ABSTRACT

A method for depositing a metal-based coating on a particulate substrate, including: i) preparing a mixture comprising the particulate substrate, a powder comprising a coating metal oxide of one or more of Ti, Al, Zn, Sn, In, Sb, Ag, Co, V, Ni, Cr, Mn, Fe, Cu, Pt, Pd, Ta, Zr, Nb, Rh, Ru, Mo, Os, Re and W, a reducing agent powder of Al metal or Al alloy, and a powder of aluminium chloride; and ii) mixing and heating the mixture to form a coating on the particulate substrate, to produce a coated substrate product.

20 Claims, 2 Drawing Sheets

THERMOCHEMICAL SYNTHESIS OF METALLIC PIGMENTS

CROSS-REFERENCE To RELATED APPLICATION

This application claims the benefit of International Application No. PCT/AU2018/051227, which was granted an International filing date of Nov. 16, 2018. The above-identified patent application is hereby incorporated by reference in their entirety.

FIELD OF THE INVENTION

The present invention relates to coated materials and a coating method.

BACKGROUND OF THE INVENTION

Coated flakes and powders are used in applications such as for corrosion protection, paint, cosmetics, architectural and decorative use, and functional materials and catalysis. Processes to form coatings on large area substrates include physical vapour deposition (PVD), chemical vapour deposition (CVD), electroplating and powder immersion reaction assisted coating (PIRAC).

For powders or flakes, PVD and CVD are usually expensive, and they tend to be practical only for up-market applications in metallic paints and cosmetics. This expense of preparation limits wide use of these materials.

Electroplating has limitations on the type of materials that can be used and is only suitable for a limited number of metals. Usually, electroplating is inadequate for coatings based on alloys, and has significant environmental disadvantages.

PIRAC is usually used to metallise ceramic substrates; description of PIRAC can be found in the literature (e.g. (i) Gutmanas and Gotman, Materials Science and Engineering, A/57 (1992) 233-241 and (ii) Xiaowei Yin et al., Materials Science and Engineering A 396 (2005) 107-114). Per this method, a ceramic substrate is immersed in a metallic powder and heated at temperatures above 800° C. to cause the substrate surface to react with the powder forming an intermediate compound on the substrate surface. For example, $Si_3N_4$ flakes are immersed in a titanium powder bed and heated at temperatures above 850° C. to form a coating of $Ti_5Si_3$ and titanium nitride.

For supported catalysts, a comprehensive review of CVD techniques for production of coatings on solid support as applied to supported catalysis can be found in Sep et al., Chem. Rev. 2002 vol 102, 3085-128. Per Sep et al., CVD processes using organometallic precursors are most popular and there are several commercial processes for depositing metals such as Ni, C, Mo, and W starting from carbonyls. Wet chemistry is also used to produce supported catalysts based on metal oxides and this is usually done by depositing a coating on the substrate from a liquid solution followed by calcination at high temperatures. Wet chemistry is limited in its ability to control the phase and the composition of the materials obtained and is usually driven by equilibrium dynamics.

The present invention provides a method for manufacturing metallic-coated particles based on Ti, Al, Zn, Sn, In, Sb, Ag, Co, V, Ni, Cr, Mn, Fe, Cu, Pt, Pd, Ta, Zr, Nb, Rh, Ru, Mo, Os, Re and W, with the ability to include additives such as C, $O_2$, $N_2$, B and/or Si, which may for example be useful as pigments or supported catalysts.

SUMMARY OF THE INVENTION

Herein, the terms "coating metal" and "$M_c$" refer to any one or more metals selected from the group comprising Ti, Al, Zn, Sn, In, Sb, Ag, Co, V, Ni, Cr, Mn, Fe, Cu, Pt, Pd, Ta, Zr, Nb, Rh, Ru, Mo, Os, Re and W, the term "reducing agent" refers to materials which may include pure metals or alloys in a powder form based on Al and/or Mg.

the term "particulate substrate" or "large area substrate" refers to a substrate in the form of powder, flakes, beads, fibres or particulates. Preferably, the substrate has an average grain size in at least one dimension of less than 10 mm, more preferably less than 5 mm, 1 mm, or 500 microns, and still more preferably less than 100 microns, 50 microns, 5 microns, or 0.5 micron, the terms "nanopowder" and "nanopowders" refer to powders comprising metallic $M_c$ -based species, wherein the powder has a component with an average grain size less than 1 micron and preferably less than 100 nanometers and more preferably less than 1 nanometer. Preferably, the said component is more than 1 weight % and more preferably more than 25%, 50% or 80% of the powder, the terms "uncoated powder" or "uncoated nanopowder" refer to metal powder/nanopowder based on the coating metals where the surface of the powder grains is substantially unoxidized, reference to a material being "based on" for example the coating metal or alloy or on Al or Mg as a reducing agent refer to the material comprising at least 10%, more preferably at least 50%, of the nominated constituent, the term "reducing metal chloride" refers to the chlorides of Al and/or Mg, $AlCl_3$ and/or $MgCl_2$.

One form of the present invention provides a method for forming metal-based coatings on a particulate substrate through reacting the substrate surface with a mixture comprising a powder of reducible precursor oxides based on one or more of Ti, Al, Zn, Sn, In, Sb, Ag, Co, V, Ni, Cr, Mn, Fe, Cu, Pt, Pd, Ta, Zr, Nb, Rh, Ru, Mo, Os, Re and W, and a reducing agent based on Al and/or Mg. The reduction reaction between the precursor oxide and the reducing agent is exothermic and the substrate acts to absorb heat generated by the reaction and moderate the reaction rate resulting in controllable reaction conditions. The precursor oxides are chosen from the oxides of the coating metals.

The novel method is hereinafter referred to as TSMP ("Thermochemical Synthesis of Metallic Pigments").

Example forms of the inventive method aim to achieve significant reduction in the temperature required by PIRAC to form the coating and/or expand the range of substrate materials and coatings that can be produced.

One form of the invention provides a method for forming metal-based coatings on a particulate substrate, including:

a—Preparing a mixture comprising a particulate substrate; and a powder comprising oxides of one or more of Ti, Al, Zn, Sn, In, Sb, Ag, Co, V, Ni, Cr, Mn, Fe, Cu, Pt, Pd, Ta, Zr, Nb, Rh, Ru, Mo, Os, Re and W; and a reducing agent powder based on Mg or Al; and b—Mixing and heating the mixture to form a coating on said particulate substrate, to produce a coated substrate product.

The mixing may occur concurrently with the formation of uncoated metal-based powder.

In accordance with a first example aspect, there is provided a method for forming a coating on a particulate substrate, wherein a mixture comprising coating metal oxides, and a reducing agent based on Al or Mg, and the particulate substrate are heated to induce reactions leading to deposition of a coating on the substrate surface.

The coating is based on alloys or compounds of the one or more of the metals Ti, Al, Zn, Sn, In, Sb, Ag, Co, V, Ni, Cr, Mn, Fe, Cu, Pt, Pd, Ta, Zr, Nb, Rh, Ru, Mo, Os, Re and W, and can optionally include one or more coating additives. Coating additives can be introduced through precursors comprising the required elements; herein, the term "coating additives" and the symbol "$M_a$" mean one or more elements or compounds based on O, N, S, P, C, B, Si, Na and Ca. The symbol "$M_z$" refers to precursors for the coating additives $M_a$; e.g. boron oxide for boron and graphite powder for carbon and $SiO_2$ for silicon.

The substrate can comprise small objects, preferably less than 10 mm, and more preferably less than 5 mm, in size in at least one dimension. More preferably, the substrate can be powder with a particle size between 1 nm and 1 mm. The substrate can be conducting or a dielectric and may be made of stable or reactive compounds; examples of suitable substrates include particulates based on silica, glass, mica, silicates, dielectric materials, graphite, carbon fibre, metal oxides, metallic powders, and metallic materials.

In accordance with a second example aspect, there is provided a method for coating particulate substrates, wherein the particulate substrate is mixed with precursor coating-metal oxide, a reducing agent and a reducing metal chloride. Preferably, the cation of the reducing metal chloride corresponds to the reducing agent being used Al or Mg, i.e. reducing agent Al with reducing metal chloride $AlCl_3$. The resulting reactants are heated at temperatures below 900° C. to induce reactions with the substrate leading to formation of a metallic coating on the substrate surface. The inventors find that addition of $AlCl_3$ or $MgCl_2$ to the oxide -reducing agent mixture helps reduce the threshold reaction temperature and improves the quality of the coated substrate. For the method of this aspect, the by-products are continuously separated from the coated substrate.

In a third example aspect, there is provided a method for forming a coating on a particulate substrate, wherein a substrate is reacted together with a mixture of metal oxides and a reducing agent based on Al. The starting reducible precursor materials may include coating metal chloride powder. The amount of chlorides used is preferably below 100 wt % of the precursor oxides and more preferably below 20 wt %, and still more preferably below 10 wt % The presence of chlorides in the reactants may improve the coating quality by facilitating transport of metallic species along the substrate surface. For the method of this aspect, the by-products may be continuously separated from the coated substrate.

In accordance with a fourth example aspect, there is provided a method for forming a coating on a particulate substrate, wherein the substrate surface is reacted with a mixture comprising metallic powder and metallic oxides to produce a metallic coating on the substrate.

The mixture may also include reducing agents such as Al or Mg. Preferably, the metallic powder is produced in-situ by exothermically reacting metal oxides with the reducing agents to produce an intermediate product including uncoated powders or nanopowders. The reducing agent is preferably based on Mg or Al, and more preferably based on Al.

In one embodiment, an intermediate mixture of uncoated powders produced from starting precursor oxides, and residual metal chlorides is produced by any available means and then mixed with a substrate powder and heated at temperatures between room temperature and 900° C. to induce formation of metallic species on the substrate surface.

In a further embodiment, the intermediate mixture is produced in-situ at temperatures between 100° C. and 600° C. The starting precursor materials may include at least one metal oxide together with chemicals containing the coating additives.

In all embodiments, coating additives can be in the form of pure elements, alloys, oxides, nitrides, Si-based compounds, B-based compounds, Na-based compounds, Ca-based compounds or a combination thereof. Examples of suitable additives include carbon black, calcium oxide, sodium bicarbonate, borates and silicates.

The amount of reducing agent can be between 0% and 500% of the amount needed to reduce the oxides to their elemental metal base. More preferably, the minimum amount of reducing agent is between 10 wt % and 200 wt % of the amount needed to reduce the oxides to their elemental base metal, and still more preferably, the minimum amount of reducing agent is between 50 wt % and 150 wt % of the amount needed to reduce the oxides to their elemental base metal. The reducing agent may be a constituent of the substrate materials and in such cases, there may be no need to include an independent reducing agent. For example, the substrate may be made of or based on Al flakes and then a part of the flake substrate would be consumed as a reducing agent and the remainder would act as substrate support for the coating. However, here, the total amount of Al in the substrate may be more than 50 times the amount of metal oxides.

The amount of coating metal oxides reduced during processing can be between 5% and 100% of their starting weight. Remaining unreacted oxides and reducing agent are discharged with the coated particles products.

The method can be operated in a batch mode, a semi-continuous mode or in a full continuous mode, and by-products are separated and removed from the reaction products, either continuously or in a batch-mode operation.

In accordance with a fifth example aspect, the present invention provides an apparatus for coating large area substrates with metal compounds, comprising:
  storage containers for holding reactants; and
  accessories for mixing, milling, and feeding powders; and
  a reactor vessel capable of operating at temperatures up to 900° C., for processing solid metal oxides, metal chlorides, metallic powders, and substrate powders; and
  a condenser and collection vessels for collecting and holding and storing by-products and coated substrate products; and
  a scrubbing unit to clean processing gases from any residual by-products.

Typically, the apparatus of this aspect of the invention is suitable for implementing the method of any of the aspects and embodiments of the invention described herein.

The TSMP method described here provides a novel technique for forming coating on a large area substrate. The method is based on exothermically reacting reducible coating metal oxides with a reducing agent in the presence of the substrate surface. Coating of the substrate is achieved through a combination of phenomena including direct deposition on the substrate surface and reactions between the surface and uncoated metallic species generated by the exothermic reduction reactions. The substrate is preferably in the form of a powder, flakes, fibres, particulates, or many small objects. The coating is based on one or more coating metals and can include any number of additive elements.

In one preferred embodiment of the method, the metal oxide precursor is first heated with a reducing metal chloride to induce reactions leading to formation of intermediates including reducible metal chlorides or oxychlorides and then the resulting intermediates are reacted with the reducing agent to form coating on the substrate either through direct deposition of the reaction product or through producing uncoated particulates that are subsequently reacted and adhered to the substrate surface.

The reducing metal chloride acts mostly to produce intermediate chloride-based species, reducing the threshold temperature of the reaction and enabling better control over the reactants and the coating quality. For example, for Ti, although coating based on metallic Ti can be produced through use of a mixture of $TiO_2$ and Al, the addition of $AlCl_3$ to the mixture results in formation of intermediate species including titanium subchlorides, which reduces the threshold of reaction temperature, facilitates transport of metallic species on the substrate surface, and helps spread reducible titanium species throughout the reactant mixture, and overall, results in improvements to the coating quality. The addition of reducing metal chlorides can be at levels between 1 wt % and 500 wt % of the metal oxides.

For the example of Fe, using $Fe_2O_3$ and Al on their own requires processing temperatures above 600° C., which limits the range of materials that can be used. The addition of $AlCl_3$ to the starting reactant mixture can result in formation of intermediate species including $FeCl_3$ and $FeCl_2$, and consequently the threshold reaction temperature reduces below 500° C., enabling coating of substrates such as soda-lime glass.

For the example of Ta, using $Ta_2O_5$ and Al, the addition of $AlCl_3$ to the starting reactant mixture results in formation of intermediate species including tantalum oxychloride and tantalum chlorides. Because these species are significantly more volatile than the oxide, they would be a better dynamic contact with the substrate, resulting in improvements to the quality of the coating.

For some other metals, the addition of $AlCl_3$ to the reactant mixture can help catalyse the reaction and reduce the threshold reaction temperature through other reaction paths. For example, reducing zinc oxide with Al usually requires heating above the melting temperature of Al at 660° C. The inventors find that the addition of $AlCl_3$ to a mixture of $SiO_2$ powder, ZnO and Al reduces the threshold reaction temperature below 600° C. and results in significant improvements in the quality of end products. For this system of $ZnO$—$AlCl_3$—$SiO_2$—Al, the presence of $AlCl_3$ facilitates formation of silicon metal through reduction of $SiO_2$ with Al at low temperatures, followed by reactions between ZnO and Si leading to formation of Zn. If excess Al was used, conversion of ZnO to Zn can reach more than 95% if long residence times and efficient mixing were used. Generally, efficiencies more than 70% are obtained under practical conditions.

For the example of Cu, adding $AlCl_3$ to a mixture of $SiO_2$ powder, CuO and Al leads to the reduction reaction dividing into two stages; the first stage occurs at less than 200° C. wherein Cu is produced through an indirect reaction comprising formation of $CuCl_2$ and then reduction of $CuCl_2$ to Cu. In the second stage, the remaining CuO are directly reduced by Al to Cu and Cu—O species.

In one embodiment, the precursor chemicals including the metal oxide, the reducing metal chloride, the reducing metal and the substrate are all mixed and processed according to any of the foregoing or following embodiment. The resulting products may be post processed to remove residuals if required. In another form of the embodiments, the precursor chemicals are arranged in two or more materials streams that are gradually fed and reacted to produce a coated substrate product. In one variation of this form, the reactants are first processed in a first reaction zone at first temperature $T_1$ and then the resulting intermediate products are processed through a second reaction zone at a temperature $T_2$ to complete the reaction.

For all embodiments, processing can be carried out in a batch mode, a semi batch mode or in a continuous mode. In all processing modes, the method includes means for managing exothermic heat generation and maintain the reactant and reactor temperature at a safe level.

For all embodiments, solid by-products of the method include reducing metal oxides and this oxide is discharged with the coated substrates and is separated by appropriate means if required. Preferably, the reducing metal oxides is a part of the end-product. The reducing metal oxide by-product may also react with the coating and the substrate and the reducing metal oxide forms part of the coated substrate.

In one example embodiment, the reducing agent is a powder based on Al or Mg, and the method includes the steps of:
  mixing the particulate substrate and the coating metal oxides to produce an intermediate mixture;
  as necessary, adding a reducing metal chloride and/or coating additives; and
  heating and mixing the resulting mixture with a reducing agent to form a coating; and
  as necessary, separating by-products from the coated substrate product.

In one embodiment of the method, the reducing metal chloride is aluminium chloride, the reducing agent is based on Al and the by-product is aluminium chloride; the terms aluminium chloride(s) and $AlCl_3$ are used to describe all Al—Cl compounds.

In one embodiment of the method, the reducing metal chloride is magnesium chloride, the reducing agent is based on Mg and the by-product is magnesium chloride; the terms Mg and Mg alloy refer to pure magnesium or alloys based on Mg and the terms magnesium chloride(s) and $MgCl_2$ are used to describe all Mg—Cl compounds.

For the discussion presented in the rest of this disclosure, we will illustrate the various embodiments and processing steps and outline procedures for processing the reactants and produce the coating using an example where the starting reactants are coating metal oxides and a reducing Al agent and aluminium chloride. It will be apparent to a person skilled in the art that when Mg is the reducing agent, minor appropriate variations may be included to handle the corresponding by-product, in particular for embodiments including use of reducing metal chlorides.

In one preferred embodiment, the present invention provides a method for coating large area substrates, comprising the steps of:
  Reduction Stage: reacting a reducible mixture of coating metal oxides, $M_cO_x$, with a reducing Al agent in the presence of a large area substrate and $AlCl_3$, and optionally including coating additives ($M_z$) to produce a reactant mixture comprising $M_c$ and/or $M_cCl_y$ and/or $M_cO_{x1}Cl_{y1}$ together with Al-$M_z$-$S_b$; preferably, processing is carried out at temperatures between 25° C. and 660° C. and more preferably at temperatures between 100° C. and 600° C.; and the Al agent is preferably in a fine powder form; and Coating Stage: continuously mixing, stirring, heating, and reacting the resulting intermediate products from the Reduction Stage, including $M_c$-$M_cCl_y$-$M_cO_{x1}Cl_{y1}$—Al—$M_z$-$S_b$, at temperatures between 160° C. and $T_{max}$ to produce metallic coating on the large area substrate; $T_{max}$ is preferably below 900° C. and more preferably below 800° C. and still more preferably below 700° C. and yet more preferably below 600° C.; and the reaction by-products comprising aluminium chloride are removed and condensed away from the coated substrate; and collecting the resulting products, and as necessary separating the coated substrate from residual un-reacted materials and washing and drying the coated substrate.

In one embodiment, the Reduction Stage and the Coating Stage occur simultaneously.

In an embodiment, the method comprises the steps of:

heating a mixture comprising one or more coating metal oxides, a large area substrate and Al and optionally including $AlCl_3$ and/or $M_cCl_y$, at temperatures below $T_{max}$ to produce intermediates comprising metallic $M_c$-based species in a nanopowder form and then induce physical or chemical reactions between the $M_c$-Al species and the substrate to produce a coating on the substrate surface; $T_{max}$ is preferably below 900° C. and more preferably below 800° C. and still more preferably below 700° C. and yet still more preferably below 600° C.; and collecting the resulting products, and as necessary separating the coated substrate from residual un-reacted materials and washing and drying coated substrate.

In one preferred embodiment, the reactants including the substrate, the metal oxides and optionally the reducing metal chlorides are fed together with the reducing agent into a reaction zone set at a temperature above the threshold reaction temperature of the reactants. In one preferred form of this embodiment for operation in both batch and continuous mode, an amount of products is kept in the reaction zone and continuously mixed with fresh reactants introduced into the reaction zone.

Preferably, the coating is based on one or more of the coating metals and the starting reducible precursors are based on the corresponding oxides of Ti, Al, Zn, Sn, In, Sb, Ag, Co, V, Ni, Cr, Mn, Fe, Cu, Pt, Pd, Ta, Zr, Nb, Rh, Ru, Mo, Os, Re and W.

Coating additives can be introduced through various solid or gaseous precursors comprising the required coating additives. The coating additive precursors can be oxides, chlorides or other compounds, and metallic powders can be included as precursor materials for the coating additives and the precursor powders would then react with the substrate and with the coating metals in the reactants to produce a coating compound.

The amount of the reducing Al agent used depends on the starting precursor materials and the required composition of the end products and can be below the stoichiometric amount needed to reduce all the reducible starting precursor chemicals. Preferably, the amount of Al is between 50% and 500% of the amount required to reduce all the chlorine in the starting reducible precursor chemicals $M_cO_x$ to their elemental metal base $M_c$.

The coating comprises a metal, an alloy or a compound based on the coating metals and can include any number of coating additives. A person ordinarily skilled in the art of the invention would appreciate that the end-product may contain residual Al impurities (or Mg where Mg is the reducing agent), and in all embodiments, the substrate coating can include Al (or Mg) at levels between 0% and 50 weight (wt) %. Also, the coating and the end-product can include the reducing agent by-product resulting from reacting the coating metal oxides with the reducing agent (e.g. $Al_2O_3$ when Al is the reducing agent). Still more, the coating and the end-product can comprise unreacted coating metal oxides.

The substrate can be conducting or a dielectric, and preferably, in the form of a powder or flakes or a multitude of small objects, and a product of said method is a substrate coated with a $M_c$-based metal or alloy. The substrate can be made of a material with a low reactivity such as oxides, nitrides or other stable compounds (e.g. silica, glass, metal oxides . . . ). Examples of suitable substrates include glass flakes, glass beads, glass powder, mica flakes, talc powder, dielectric flakes, carbon fibre, metallic flakes, beads and powder, and steel balls, or other small object with large areas (e.g. fastening accessories, screws, washers, bolts . . . ). In other embodiment, the substrate is made of materials based on metallic or semi metallic elements; e.g. Al, Mg, transition metals, graphite, silicon-based and boron-based or mixtures thereof.

Preferably, the substrate is mixed with the reducible solid coating metal oxides or the reducing Al agent, prior to reacting with the remaining reactant (reducing Al agent or reducible coating metal oxides). Preferably, during processing in both the Reduction Stage and the Coating Stage, the substrate and the solid reactants including the coating metal oxides and the reducing Al agent are continuously mixed to maximise contact between the substrate surface and the solid reactants and improve coating of the substrate surface.

The maximum processing temperature $T_{max}$ is determined by factors including the kinetic barrier of reactions between the precursor materials and the reducing agent and the adhesion of the coating to the substrate and preferably this maximum is below the melting temperature of the substrate. However, the maximum temperature can exceed the melting temperature of the substrate if the deposited materials are required to diffuse through the bulk of the substrate. In all preferred embodiments, the present invention is intended for operation at a maximum temperature around 900° C. By way of illustration only, if tantalum was the coating material and the substrate was made of borosilicate glass beads or borosilicate glass flakes, and for processing at 1 atmosphere, then $T_{max}$ can be less than 600° C. For coating on a mica substrate, $T_{max}$ can be set up to 700° C. For coating on graphite powder, $T_{max}$ can be up to 850° C. For coating on a soda-glass substrate, $T_{max}$ can be up to 650° C. but is preferably below 550° C.

In all embodiments, the maximum processing temperature of reactants including the substrate is preferably below the melting temperature or the decomposition temperature of the substrate.

Reactions between the coating metal oxides and Al(or Mg) are exothermic. Therefore, it is preferred to carry out the method gradually, and in a preferred embodiment, the present invention provides a method for coating of large area substrates, comprising the steps of:

providing a first reactant including reducible precursor chemicals with at least one solid coating metal oxide; and providing a second reactant including a reducing agent based on Al in a fine particulate form; the amount of Al is between 0% and 500% of the amount required to reduce $M_cO_x$ to $M_c$; and providing a third reactant including a reducing metal chloride $M_rCl_y$, preferably aluminium chloride; $M_r$ refers to the reducing metal and $M_rCl_y$ to the reducing metal chloride. The amount of the reducing metal chloride is between 0% and 500 wt % of the Al amount; the second reactant and the third reactant are preferably mixed into a single stream; and providing precursor materials for the coating additives; and preparing a first stream of materials consisting of a mixture of the substrate and at most one of the first reactant or the second reactant; and gradually mixing and reacting the said first stream of materials including $M_cO_x$ or the Al reducing agent with a second stream including the remaining reactant (Al reducing agent and $M_rCl_y$) at temperatures between 100° C. and 900° C. for periods enough to reduce all or a part of the solid coating metal oxides and form a coating on the substrate; reactions between the starting precursor chemicals are heterogeneous and the substrate acts as a catalyst for the reaction; and condensing the resulting by-products away from the other reactants; and collecting the resulting products, and as necessary separating the coated substrate from residual un-reacted materials and washing and drying the coated substrate.

In one embodiment for continuous operation, the solid mixture of the substrate and the reducing Al agent are processed at temperatures, preferably increasing continuously or in a number of incremental steps from a temperature $T_1$ at the point where the mixture enters the reactor to a temperature $T_{max}$ below 900° C., before the resulting products are cooled and discharged out of the reactor. Preferably, $T_1$ is above 100° C. and more preferably above 180° C., and $T_{max}$ is less than 900° C. and preferably below the melting or decomposition temperature of the substrate. The resulting products are then cooled and discharged for further processing.

In one other embodiment for continuous operation or batch operation, the solid mixture of precursor chemicals, the substrate and the reducing Al agent are first processed in a first stage at temperatures between 100° C. and $T_1$ below 660° C. for a certain residence time $t_1$ and then the resulting intermediate products are processed through a second stage at temperatures between 100° C. and $T_2$ below 900° C. for a certain residence time $t_2$, leading a final coated product.

In one preferred embodiment for continuous operation and batch operation, the mixture of $M_cO_x$—$AlCl_3$—$S_b$—Al is first heated at temperatures below 500° C. for times long enough to reduce a part of the reducible precursor chemicals and form intermediate products including $M_cCl_n$ and/or $M_cO_yCl_m$ and/or $M_c$-based nanopowder. Then, the resulting reactants are heated at temperatures between 300° C. and $T_{max}$ below 900° C. and preferably below the decomposition or melting temperature of the substrate.

In any of the embodiments, the process may be carried out in an inert gas, or in a non-reactive gas or a mixture of non-reactive gas and a reactive gas; examples of adequate gases include Ar, Ar—$O_2$, $N_2$ or $CO_2$ and $N_2$—$O_2$. Where a mixture is used, the amount of reactive gas is controllable.

In one embodiment, the gas stream consists of a mixture of Ar and reactive components such as $O_2$ and $NH_3$. For example, when $O_2$ is included in the gas stream, the coating can comprise metal oxides.

In one embodiment, a stream of gas is arranged to flow in a direction away from the reactants and the solid reaction products.

In one embodiment for batch mode operation, the reactants and the substrate are fed gradually or together to a reactor set at temperature above 100° C., and then the reactants are heated and stirred continuously until the coating process is complete.

In one embodiment, the precursor materials include reactive additives and then the coating would include compounds based on the coating metals and the additives. For example, for additives of carbon, silicon, boron, oxygen and nitrogen, the coating can comprise carbides, silicides, borides, oxides and nitrides respectively.

In one embodiment, the method comprises an additional step wherein materials obtained at the end of the coating process are reacted with gaseous reactants at temperatures between 25° C. and 850° C. Gaseous reactants include gases containing reactive elements such as oxygen, nitrogen, boron and carbon. For example, an $M_c$ coated substrate may be heated in a stream of oxygen to produce a $M_c$-based oxide. Alternatively, coating of metal oxides on glass beads can be achieved by carrying out the reaction in a stream of argon containing a certain concentration of oxygen.

For embodiments involving use of reactive gases, the reactive gases are preferably introduced in the Coating Stage, and more preferably after the substrate has been coated.

In one embodiment, the product of the method is a substrate coated with a compound based on reactive gas and then the amount or flow of reactive gas used is controlled to obtain the required end-product composition. In one example of this embodiment, the reactive gas includes oxygen and the coating is made of metal oxide. Then, the amount of oxygen in the reactive gas and the processing times of the reactants are both adjusted to control the amount of oxygen in the coating. The amount of oxygen in the coating can be between 0% and the amount corresponding to the highest valence oxide of the coating metal.

In a second example of this embodiment, the reactive gas includes nitrogen such as $NH_3$ and the coating is made of coating metal nitride and the amount of nitrogen in the reactive gas and the processing times of the reactants are adjusted to control the amount of nitrogen in the coating. The amount of nitrogen in the coating can be between 0% and the amount corresponding to the highest valence nitride of the coating metal.

In a third example of this embodiment, the reactive gas includes carbon such as $CH_4$ and the coating is made of coating metal carbide and the amount of carbon in the reactive gas and the processing times of the reactants are adjusted to control the amount of carbon in the coating.

In one example embodiment, the coating metal oxides and the reducing Al agent are separately mixed with $AlCl_3$ before carrying out the reactions according to any of the foregoing or following embodiments. The mixing step is intended to increase the dilution of the reactants and increase contact surface area with the substrate while at the same time avoid any potential unintended reaction occurring prior to mixing with the substrate. The amount of $AlCl_3$ can be between 10% and 500% of the volume of the substrate.

In one embodiment, the method includes an additional step, wherein the substrate is heated with the reducing metal chlorides (e.g. $AlCl_3$) at temperatures between 100° C. and 500° C. to induce modifications in the substrate surface. Then, the resulting modified substrate is processed with the other precursor chemicals according to any of the embodiments. In one form of this embodiment, the additional step consists of heating the substrate with a mixture of the reducing metal chloride (e.g $AlCl_3$) and the reducing agent (e.g. Al powder). The amount of the reducing metal chloride and reducing metal used in this step are between 0% and 200 wt % of the weight of the substrate.

In one form of this embodiment, residual metal chlorides are removed before processing the resulting modified substrate with the other reactants.

In one embodiment, a reducing metal chloride (e.g. $AlCl_3$) is first reacted with the precursor metal oxides and the resulting reactants are then mixed with the substrate and the reducing agent prior to processing as per any of the foregoing and forthcoming embodiments.

In one embodiment, a reducing metal chloride (e.g. $AlCl_3$) is first reacted with the precursor metal oxides and the reducing agent (e.g. Al) and the resulting reactants are then mixed with the substrate prior to processing as per any of the foregoing and forthcoming embodiments.

In one embodiment, reducing coating metal chlorides are mixed with the starting coating metal oxides and the reducing agent before adding the substrates in order to increase their dispersion with the large volume substrate.

In one embodiment, the volume of the $AlCl_3$ is approximately equivalent to the volume of the substrate.

In one embodiment, the coating metal oxides are mixed with $AlCl_3$.

In one embodiment, the reducing agent is mixed with $AlCl_3$.

In one embodiment, the reducing agent is mixed with the substrate or a part of the substrate.

In one embodiment, Al and $AlCl_3$ are introduced together as a mixture and preferably the $AlCl_3$—Al are co-milled prior to mixing with the other reactants.

In one embodiment, the reactants are introduced through a number of materials streams. One stream includes a mixture of the reducing agent and a part of the substrate and another stream includes a mixture of the metal oxides and a part of the substrate. In one form of this embodiment, the mixtures are produced through co-milling.

In one embodiment, the reducing agent and the substrate or a part of the substrate are co-milled together to reduce the size of the Al particle size and/or the substrate particle size.

In one embodiment, the step of mixing the reducing agent with $AlCl_3$ is done by co-milling. In one form of this embodiment, the reducing agent is based on Al.

In one embodiment, both the coating metal chlorides and the reducing agent are both separately mixed with $AlCl_3$. The mixing step can be carried out using any suitable means.

In one embodiment, the step of mixing the metal oxides with $AlCl_3$ is done by co-milling.

In all embodiments, the step of mixing any combination of reactants, substrate and reducing agent can be done by co-milling.

In one embodiment, the step of mixing the metal oxides with $MgCl_2$ is done by co-milling.

In any of the embodiments, the coating on the coated products can include metallic particulates, residual materials from the reducing agent, reducing metal oxides and/or unreacted coating metal oxides.

In one embodiment, the method is used for preparation of multilayered compounds using pre-coated substrates as a starting coating platform. For example, in a first step the method can be used to deposit a first coating onto a substrate and then the resulting coated substrate is used again in a second step as a coating platform to deposit a second layer of materials. For example, glass beads can be used in a primary step to deposit a layer containing titanium and then the resulting product is used as a platform to deposit a second layer containing vanadium.

In one embodiment, all or a part of the substrate can react with the coating to produce a product with a coating of intermetallics, alloys or compounds based on the substrate materials and the coating materials.

In one embodiment, the method comprises reacting a part of the substrate with the coating metal to produce a product of intermetallics, alloys or compounds based on the substrate materials and the coating materials. For example, when the precursor materials are $M_cO_x$ and the substrate is a powder of graphite, then the product of said method can be a graphite powder with a coating including metal carbides.

In one embodiment, the coating reacts with the substrate to form composite materials or compounds based on the substrate and the coating.

In one embodiment, the coating reacts partially with the substrate to form a coating based on the substrate and the coating.

In one embodiment, the substrate materials include silicon-based chemicals and the coating includes metal silicides.

In one embodiment, the substrate is a glass powder or glass flakes and the coating includes metal silicides. In one form of this embodiment, the substrate is based on borosilicate and the coating includes compounds based on $M_c$-Si—B.

In any of the embodiments, the method can comprise the step of separating the end products of coated substrate from any residual un-reacted precursor materials and un-reacted aluminium. The method can also include the step of washing and drying the end products.

In any of the embodiments, the weight ratio of coating metal oxides to substrate is between 1 wt % and 500 wt %, and preferably between 1 wt % and 200 wt %, and more preferably between 5 wt % and 100 wt % and more preferably between 5 wt % and 50 wt %.

In any of the embodiments, the method can be carried out at pressures between 0.01 mbar and 1.1 bar.

The method may be suitable for a wide range of particle size for the coating metal oxide, and the reducing agent and reducing metal chloride powders. For example, sizes in the range of 50 nm to 10 mm may be employed. However, small particle sizes less than 50 microns are preferred. Nanopowders with particle sizes less than 1 micron, or preferably less than 100 nm, can be used and usually they lead to more effective solid-solid reactions and better end-products.

Example forms of the method provide an enhanced coating technique with advantages over prior technologies such as CVD processing and PIRAC, due to its ability to reduce the processing temperature and extend the range of materials that can be used. The exemplary forms of the present approach differ from prior art CVD processing and PIRAC processes in several other major aspects:

1—starting precursor materials are metal oxides;
2—the method is based on exothermic reduction reactions between precursor coating metal oxides and a reducing agent;
3—in-situ production of the intermediate nanopowder mixture;
4—TSMP may combine the advantages of the oxide and chloride chemistry; d 5—the method reduces the threshold reaction temperature and allows for deposition of coating compositions (e.g. alloys) usually unobtainable under conditions prevailing in PVD and CVD;

6—the process produces no or minimal waste; and

7—Al and Mg are attractive reducing agents due to their ready availability, low cost, and their compounds (e.g. $AlCl_3$) are valuable industrial chemicals and do not present significant handling difficulties.

For the present approach, coating of the substrate in example forms of the invention may result from a combination of mechanisms and effects, including one or more of:

i—direct deposition of coating metals on the substrate surface due to reactions between reducible species and the reducing agent; and ii—heterogeneous reactions taking place at the surface of the substrate and leading to deposition of elemental products directly on the substrate surface; and iii—formation of metallic nanoparticles and clusters followed by adhesion to the surface; and iv—reaction of the in-situ formed metallic nanoparticles with the substrate surface, leading to formation of $M_c$-based coating; and v—reactions between the substrate surface and precursor materials.

Discussion here mostly referring to an example using coating metal oxides, and an Al reducing agent and $AlCl_3$ is only intended for illustrating physical mechanisms and aspects of the technology. However, the discussion is not intended to be comprehensive and/or to limit the present invention to any theory or mechanism of action.

Reduction reactions between some metal oxides (e.g. $TiO_2$, $Ta_2O_5$, $NiO$) and Al or Mg are heterogeneous, and they tend to occur on a solid surface where elemental $M_c(c)$ can condense. For embodiments and procedures using such oxides, the substrate surface can be a primary condensation surface for $M_c(c)$, and then, the substrate can play an important role as a catalyst in helping generate the $M_c$-based nanopowder and metallic species and forming the coating. Generally, $M_c(c)$ species generated on the substrate surface do not necessarily adhere to the surface if the temperature was below a minimum threshold adhesion temperature. For example, for a substrate of glass flakes, processing at 450° C. under 1 atm does not produce any coating, while processing at 600° C. results in metallic coating. However, localised increase in temperature of the substrate surface due to exothermic heat generation promotes adhesion of elemental $M_c$ species to the substrate surface; reactions occurring immediately adjacent to or on the substrate can increase the local temperature above the threshold adhesion temperature and then lead to the $M_c(c)$ products directly adhering to the surface.

In a preferred embodiment, process conditions are arranged to maximise reactions between $M_cO_x$ and Al taking place at the substrate surface through efficient mixing of the reactants at temperatures between 200° C. and 600° C. When reduction reactions are not taking place on the substrate surface, small nanometre (or sub-nanometer) clusters and agglomerates based on $M_c$ and $M_c$-Al can form and efficient mixing is required to bring the agglomerates into contact with the substrate before they form large particles and either become lost to the process or deteriorate the quality of the coating. Therefore, vigorous stirring of the reactants may be required in some embodiments to maximise contact between the various components of the mixture and optimise coating of the substrate surface.

Stirring helps bring nanoparticles and unsaturated species produced during processing into contact with the substrate and then those species can react, disproportionate and adhere to the surface and hence help improve the quality of the coating.

Also, adsorption (both chemical and physical) of elemental $M_c$ can contribute to formation of the coating on the substrate surface.

A key aspect of the present method is due to the enhanced ability of the $M_c$-based nanoparticles to react with the substrate leading to formation of coating based on $M_c$ and the substrate materials. The small particle size of the powder with the associated high surface energy together with the presence of active residual chlorides can have an important role in enabling the reduction of the threshold reaction temperature. The presence of residual chlorides is known to enhance transport of coating materials along the substrate surface and help breakdown the usually stable oxide coating of the substrate surface.

As the particles/nanoparticles/clusters are substantially free of oxygen coating, they tend to react more effectively with the substrate surface resulting in formation of a coating at temperatures lower than would normally be required if a conventional micron size metal powder coated with an oxide layer was used—as is the case with all similar prior art (i.e. PIRAC).

For embodiments discussed before centred on $M_c$-based coating, direct reactive interactions between $M_c$-based phases and the substrate can play an important role in the coating process; the substrate surface can react with other solid reactants and the resulting coating can comprise compounds based on the substrate materials and the coating materials. Reactions between the substrate materials and the reactants can lead to formation of an intermediate layer comprising compounds made of the coating metal and the substrate materials. Depending on the thickness of the coating, the amount of substrate materials in the coating can decrease past the intermediate layer as the thickness of the coating increases.

In some embodiments, the substrate is reactive, and coating or metallisation of the substrate is mostly due to reactions between the substrate surface and metal metal-based species generated by reaction involving coating metal oxides and a reducing agent. In such embodiments, the amount of reducing agent (e.g. Al) can be reduced substantially even down to zero as the substrate has the capacity to act as a reducing agent. Coating of the substrate surface according to this mechanism is claimed an integral part of the present disclosure.

It is noted that reactions between the nanopowders and the substrate are not limited to chemical reactions, and other physical interactions can lead to adhesion of elemental $M_c$ species to the surface. For all embodiments and configurations discussed here, it is intended that the term "reaction between the substrate surface and nanopowder" include physical interactions and disproportionation reactions occurring on the substrate surface and leading to direct coating of the surface.

In some embodiments, the coating metal does not react chemically with the substrate and then the coating is entirely made of the metal/additive compounds. However, in preferred forms of the present invention, formation of the coating is substantially promoted by the small size of the intermediate metallic particles and the absence of oxides on the surface of the particles.

It follows from the discussion that the main mechanisms likely to contribute most to the coating are due to:

i—direct deposition of metallic species on the substrate surface; and ii—reactions between the substrate and the nanopowder; and iii—direct reactions between the substrate and the starting coating metal compounds (e.g. oxides and oxychlorides).

Further embodiments of the invention will be apparent from the following description, and from the claims.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

Figure 1:
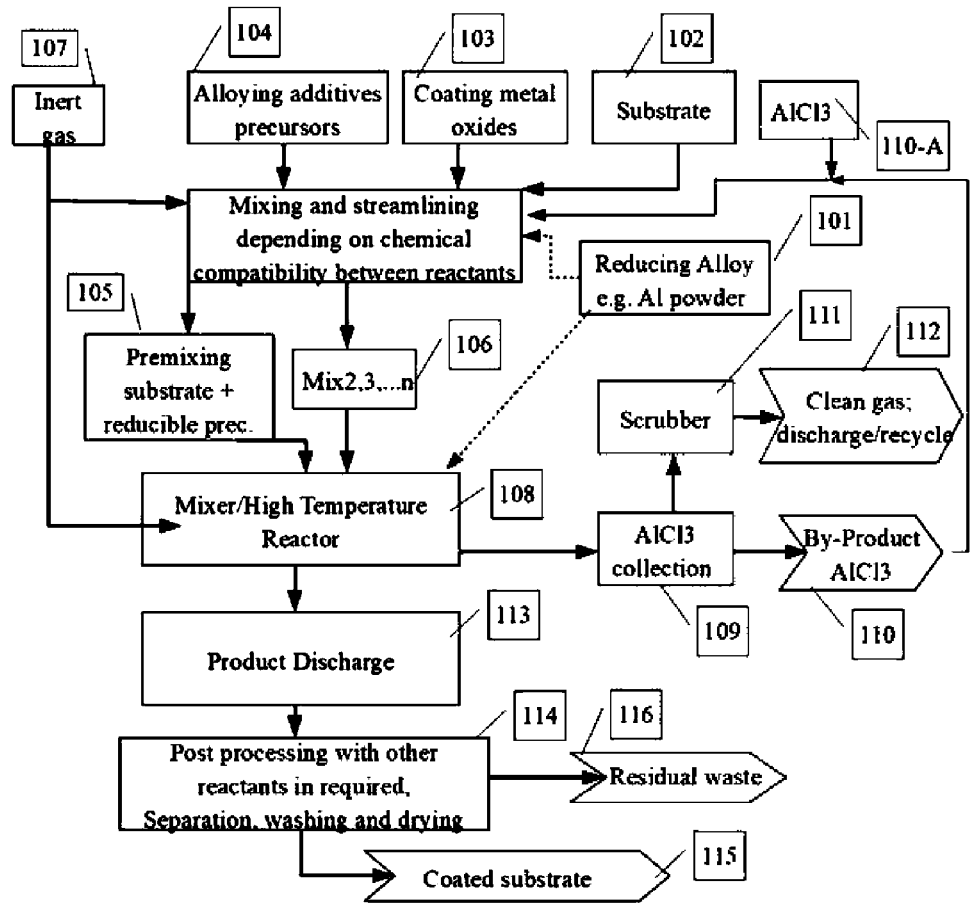
FIG. 1 shows a process schematic for one example embodiment illustrating steps for coating a substrate using an Al reducing agent.

FIG. 1 is a schematic diagram illustrating processing steps for one preferred embodiment for production of a coated substrate starting from metal oxides and Al.

In a first step (101), a fine powder of the reducing agent (e.g. Al) is prepared. The powder can be introduced separately or together with other reactants depending on compatibility with other precursor chemicals.

The substrate (102) (e.g. glass flakes or powder) is mixed with the coating metal oxide(s) (103) together with other compatible coating additives (104) leading to a first mixture (105). The remaining coating additive precursors (104) (e.g. borax, graphite powder) are prepared into several mixtures (106). Mixing and preparation of the precursor materials is carried out under a protective atmosphere (107).

The substrate (102) and/or the reducing Al (101) may be mixed with $AlCl_3$ (110-A) before processing through the reaction zone.

Reactants are arranged in separate streams depending on chemical compatibility. For example, it is preferred not to premix reactants which have the potential to react exothermically leading to the release of excessive amounts of heat.

The reducing Al agent (101) and mixtures (105) and (106) are fed into a pre-mixer (not shown) and then into a reaction zone where they are mixed, stirred and reacted at temperatures between 160° C. and 800° C. (108), depending on the substrate materials and coating.

The resulting by-products (109), including aluminium chlorides, are condensed away from the solid reactants, and collected in a dedicated vessel (110). A part or all of the aluminium chlorides may be recycled through (101). All processing steps are preferably carried out under an inert gas or a non-fully reactive gas (e.g. Ar, $CO_2$, $N_2$, Ar—$O_2$ ... ) and the exit of the by-product collection step, the gas is cleaned in a scrubber (111) before discharging into the atmosphere or recycling (112).

At the end of the reaction cycle (108), the solid products are discharged or moved into another reaction zone (113). If required, the products can then be reacted further with gaseous reactant for example before separating the coated substrate from residual undesired compounds and then substrate may be washed and dried (114) leading to end products (115).

Figure 2:
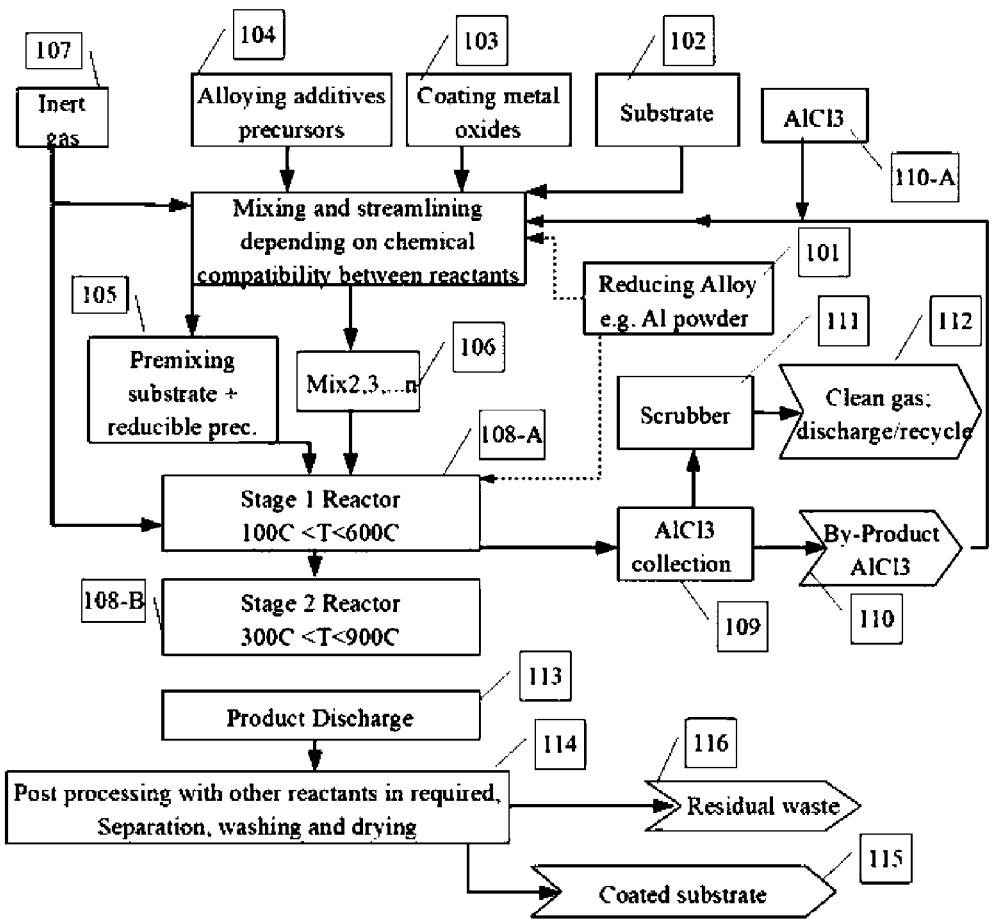
FIG. 2 shows a process schematic illustrating processing steps for a further example embodiment for two-step production of a coated substrate starting from metal oxides and Al.

FIG. 2 is a schematic diagram illustrating processing steps for one preferred embodiment for production of a coated substrate starting from metal oxides and Al but with processing carried out through two processing stages. This arrangement is suitable for a number of metals (e.g. Cu and Zn) Here, the reactants such as the mixture substrate-metal oxides-Al—$AlCl_3$ or some constituents of the reactants (e.g. a mixture of metal oxides-Al—$AlCl_3$ or a mixture substrate-metal oxides-$AlCl_3$) are first processed in Stage 1 (108-A) to carry out some of the chemical reactions such as converting a part of the metal oxides to metal chlorides, and then, the reactants are further heated in Stage 2 (108-B) to complete processing and produce the coated end-products.

Residual waste (116) is stored separately for further processing or disposal.

Materials produced by preferred forms of the invention described here may have unique characteristics that may not be obtained using prior art methods.

The invention extends to materials made using the invention and use of the materials, without being limited by the examples provided herein by way of illustration. Specific example properties may include the ability to produce nanostructured coating for large area substrate of complex composition usually unachievable with conventional physical vapour deposition or chemical vapour deposition.

Another important aspect of preferred forms of the present invention is to provide coated substrates with coatings having predetermined chemical compositions and phases present in the coating, enabling control over the physical and optical properties of the coated substrate. In one form of this aspect, the coating constituents are made to react with the substrate surface allowing chemicals from the substrate to enter the coating compositions and therefore to have influence over the chemical and physical properties of the end products.

One example of the quality and use of example materials produced using the current technology is in production of luxury metallic pigment for use in the automotive paint industry and in the wider pigment industry in general. There are various techniques capable of producing a limited number of metal flake pigments; however, these techniques are currently limited to common metals such as aluminium, and for a number of other metals, the cost can be prohibitive. For example, the example forms of the present method allow for production of low cost pigment with various hues, optical properties and functional characteristics that cannot be manufactured using existing technologies. Such metallic pigments can be attractive for use in the plastics industry, automotive paint, and in general paint and architectural applications. Such pigments and their use are claimed as a part of the present invention.

The following are examples of preparation of various coating compounds in accordance with an embodiment of the present invention.

EXAMPLE 1

Ti on Glass Flakes 200 g of borosilicate glass flakes are mixed together with 20 g of $TiO_2$ powder, 10 g of Al and 20 g of $AlCl_3$ powder. The mixture was then fed and reacted in a continuous reactor at temperatures ramping from room temperature to 600° C. The coated flakes were then washed in water and dried. The coated flakes have metallic appearance. Examination under an SEM and EDX shows the presence of metallic Ti, TiO— Ti—Al and Ti—Si species including the presence of lumps of metallic Ti. Al was also detected in the sample.

EXAMPLE 2

Ti on Glass Flakes 200 g of soda-lime glass flakes are mixed together with 20 g of $TiO_2$ powder and 10 g of Al powder (4 microns).

The mixture was then fed and reacted in a continuous reactor at a temperature ramping from room temperature to 600° C. with a residence time of 20 minutes. The coated flakes were then washed in water and dried. The coated flakes have metallic appearance. Examination under an SEM and EDX shows that the surface is coated with metallic Ti but with the presence of Ti-based metallic lumps. Al was also detected in the sample. XRD analysis of the sample indicates the presence of residual $TiO_2$.

EXAMPLE 3

Cu on Glass Flakes 200 g of borosilicate glass flakes.
20 g CuO.
18 g of Al—$AlCl_3$ mixture (1 wt part Al to 2 part $AlCl_3$ per weight). Al is 4 microns.

The CuO—Al—$AlCl_3$ were mixed with the flakes (6 microns) and then the resulting reactant mixture was heated in a continuous reactor at 600° C. (residence time=30 minutes). The coated flakes were then washed and dried. The end products have a deep marron colour consisting of a mixture of Cu, $Cu_2O$ and CuO.

EXAMPLE 4

Cu on Borosilicate Glass Flakes 150 g borosilicate glass flakes.
30 g of a CuO.
30 g of $AlCl_3$.
7 g of Al powder (4 microns).

The flakes, the $AlCl_3$ and CuO are first mixed together, and then fed together with the Al into a first reactor set at 180° C. for a residence time of 15 min. The resulting intermediates are then transferred into a second reactor at a temperature 600° C. for another 15 min. In both reactors, the reactants are continuously mixed.

The products are then discharged and processed. The product has a maroon colour.

EXAMPLE 5

Cu on Borosilicate Glass Powder (10 Microns)

150 g borosilicate glass powder.
30 g of a CuO.
10 g of $AlCl_3$.
7 g of Al powder (4 microns).

The substrate powder, the $AlCl_3$ and CuO are first mixed together and then fed together with the Al into a first reactor set at 180° C. for a residence time of 15 min. The resulting intermediates are then transferred into a second reactor at a temperature 600° C. for another 15 min. In both reactors, the reactants are continuously mixed.

The products are then discharged and processed. The product has a yellow-gold colour.

EXAMPLE 6

Cu—Zn on Glass Flakes 150 g of soda-lime glass flakes (100 microns).
7.5 g of CuO+7.5 g of ZnO.
4.5 g of Al powder (4 microns) milled with 9 g $AlCl_3$ powder.

The reactants were mixed, and the resulting mixture was heated in a continuous reactor for a residence time for 30 minutes. The resulting product was then discharged, and then washed and dried. The powder has a shiny appearance. SEM analysis shows occasional lumps on the coated surface.

EXAMPLE 7

Zn on Silica Powder (10 Microns)

200 g silica powder (average particle size=10 microns).
50 g of ZnO.
10 g of $AlCl_3$.
20 g of Al powder (4 microns).

The silica powder, the ZnO and the $AlCl_3$ are first mixed together and then the Al is added, and the reactants are heated and continuously mixed in a batch reactor at temperatures of 600° C. for one hour.

The products are then discharged and processed. The product has a grey colour. Various analyses including XRD, SEM and EDS suggest a ZnO-to-Zn conversion efficiency of the order of 75%.

EXAMPLE 8

Zn on Fumed Silica Powder (400 Nm)

100 g fumed silica powder (average particle size=300-400 nm).
100 g of ZnO.
20 g of $AlCl_3$.
40 g of Al powder (4 microns).

The reactants are first mixed together. The reactor is brought to a temperature of 600° C. The materials are then fed gradually while monitoring reactant temperature and reaction rate. At the end of the feeding process, the materials are further processed for 30 min at 600° C. During processing the reactants are continuously mixed.

The products are then discharged and washed. The products have a grey-brownish colour. Various analyses including XRD, SEM and EDS suggest a ZnO-to-Zn conversion efficiency of the order of 70%.

EXAMPLE 9

Zn on Silica Nanopowder (<100 Nm)

100 g silica nanopowder (<100 nm).
100 g of ZnO.
20 g of $AlCl_3$.
40 g of Al powder (4 microns).

The powder is first dried and then mixed with the rest of the reactants. The reactor is brought to a temperature of 600° C. The materials are then fed gradually while monitoring reactant temperature and reaction rate. At the end of the feeding process, the materials are further processed for 30 min at 600° C. During processing the reactants are continuously mixed.

The products are then discharged and washed. The products have a greyish colour. Various analyses including XRD, SEM and EDS suggest a ZnO-to-Zn conversion efficiency of the order of 67%.

EXAMPLE 10

Zn on Glass Flakes 100 g borosilicate glass flakes (particle size less than 50 microns and 1 micron thick).
25 g of ZnO.
2.5 g of $AlCl_3$.
10 g of Al powder (milled Al flakes).

The reactants are first mixed together. The reactor is brought to a temperature of 600° C. The materials are then fed gradually while monitoring reactant temperature and reaction rate. At the end of the feeding process, the materials are further processed for 30 min at 600° C. During processing the reactants are continuously mixed.

The products are then discharged and washed. The products have a metallic appearance. ZnO-to-Zn conversion efficiency of the order of 75%.

EXAMPLE 11

Zn on Silica Powder (10 Microns)

200 g silica powder (average particle size=10 microns).
100 g of ZnO.
20 g of $AlCl_3$.
40 g of Al powder (4 microns).

The silica powder, the ZnO and the $AlCl_3$ are first mixed together and then the Al is added, and the reactants are heated and continuously mixed in a batch reactor at temperatures of 600° C. for one hour.

The products are then discharged and processed. The product has a grey colour. Various analyses including XRD, SEM and EDS suggest a ZnO-to-Zn conversion efficiency of the order of 75%.

EXAMPLE 12

Sn—Cu on Silica Powder (−600 Mesh)

150 g silica powder (−600 mesh).
15 g of a $SnO_2$.
20 g of $AlCl_3$.
2.5 g of Al powder (4 microns).

The substrate powder, the $AlCl_3$ and $SnO_2$ are first mixed together and then processed together with the Al at temperatures up to 700° C. The resulting powder is then used as a substrate to deposit Cu as follows:
30 g of a CuO.
30 g of $AlCl_3$.
7 g of Al powder (4 microns).

The substrate powder, the $AlCl_3$ and CuO are first mixed together and then fed together with the Al into a first reactor set at 180° C. for a residence time of 15 min. The resulting intermediates are then transferred into a second reactor at a temperature 600° C. for another 15 min. In both reactors, the reactants are continuously mixed.

The products are then discharged and processed.

EXAMPLE 13

Cr on Borosilicate Glass Flakes 100 g borosilicate glass flakes (particle size less than 50 microns and 1 micron thick).
50 g of $Cr_2O_3$.
10 g of $AlCl_3$.
15 g of Al powder (4 microns).

The flakes, the $Cr_2O_3$ and the $AlCl_3$ are first mixed together and then the Al is added. The reactor is brought to a temperature of 600° C. The materials are then fed gradually while monitoring reactant temperature and reaction rate. At the end of the feeding process, the materials are further processed for 30 min at 600° C. During processing the reactants are continuously mixed.

The products are then discharged and processed. The product has a dark metallic colour colour.

A part of the materials was then heated in air at a temperature of 600° C. resulting in a powder with a green colour.

EXAMPLE 14

Fe on Glass Flakes 150 g of borosilicate glass flakes.
10 g of $Fe2O_3$ powder was milled with 10 g of $AlCl_3$ powder.
3.5 g of Al powder (4 microns) was milled with 10 g of $AlCl_3$ powder.

The reactants were all mixed and then the resulting mixture was processed in a continuous reactor at 600° C. for a residence time of 30 minutes. The resulting product was then discharged, washed, and dried. The flakes have a shiny deep dark greyish appearance.

A part of the materials was then heated in a stream of oxygen at a temperature of 600° C. resulting in a powder with a orange-red colour. XRD analysis indicates the presence of $Fe_2O_3$.

EXAMPLE 15

Stainless Steel on Borosilicate Glass Flakes (50 Microns)

150 g borosilicate glass flakes (particle size less than 50 nm and 1 micron thick).
7.5 g of a mixture of oxides: $Fe_2O_3$, $Cr_2O_3$, NiO and $MoO_3$.
10 g of $AlCl_3$.
5 g of a milled mixture of Al powder and $AlCl_3$ ratio 1 to 2.

The flakes and the reactants are all mixed together. The reactor is brought to a temperature of 600° C. The materials are then fed gradually while monitoring reactant temperature and reaction rate. At the end of the feeding process, the materials are further processed for 30 min at 600° C. During processing the reactants are continuously mixed.

The products are then discharged and processed. The product has a dark metallic colour.

EXAMPLE 16

Ta on Silica Powder (10 Microns)

150 g glass powder (−600 mesh).
15 g of a $Ta_2O_5$.
15 g of $AlCl_3$.
2 g of a powder (4 microns).

The substrate powder, the $AlCl_3$ and $Ta_2O_5$ are first mixed together and then fed together with the Al into a reactor set at 700° C. for a residence time of 15 min. The reactants are continuously mixed during processing.

The products are then discharged and processed.

EXAMPLE 17

Iron Oxide on Mica Powder 150 g glass powder (−600 mesh).
30 g of a $Fe_2O_3$.
50 g of $AlCl_3$.
7.5 g of Al powder (4 microns).

The substrate powder, the $AlCl_3$ and $Fe_2O_3$ are first mixed together and then fed together with the Al into a reactor set at 700° C. for a residence time of 15 min. The reactants are continuously mixed during processing.

The products are then discharged and processed.

EXAMPLE 18

Titanium on Synthetic Mica Powder 150 g on borosilicate glass powder (10 microns).
30 g of a $TiO_2$.
30 g of $AlCl_3$.
10 g of Al powder (4 microns).

The substrate powder, the $AlCl_3$ and $TiO_2$ are first mixed together and then fed together with the Al into a reactor set at 700° C. for a residence time of 15 min. The reactants are continuously mixed during processing.

The products are then discharged and processed.

EXAMPLE 19

Zn on Silica Powder (10 Microns)

200 g silica powder (average particle size=10 microns).
100 g of ZnO.
20 g of $AlCl_3$.
40 g of Al powder (4 microns).

The silica powder is loaded into a reactor at a temperature of 600° C.

The Al is mixed with the $AlCl_3$.

The ZnO and the Al—$AlCl_3$ are fed gradually into the reactor at 600° C. and mixed and heated with the silica powder for 30 minutes.

The products are then discharged and processed. The product has a grey colour. Various analyses including XRD, SEM and EDS suggest a ZnO-to-Zn conversion efficiency of the order of 75%.

For all embodiments and examples provided above, the Al reducing agent can be replaced with Mg and the $AlCl_3$ reducing metal chloride can be replaced with magnesium chloride without any significant change in the processing conditions. Then, only minor variations would be required to handle the by-products including magnesium chloride when magnesium chloride is used as a part of the starting reactants.

The present method may be used for production of coating or compounds of various compositions based on Ti, Al, Zn, Sn, In, Sb, Ag, Co, V, Ni, Cr, Mn, Fe, Cu, Pt, Pd, Ta, Zr, Nb, Rh, Ru, Mo, Os, Re and W including compounds of pure metal, oxides, nitrides of other non-inert elements as described above. Modifications, variations, products and use of said products as would be apparent to a skilled addressee are deemed to be within the scope of the present invention.

In the claims which follow and in the preceding description of embodiments, except where the context requires otherwise due to express language or necessary implication, the word "comprise" and variations such as "comprises" or "comprising" are used in an inclusive sense, to specify the presence of the stated features but not to preclude the presence or addition of further features in various embodiments of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

It will be understood to persons skilled in the art of the invention that modifications may be made without departing from the spirit and scope of the invention, in particular it will be apparent that certain features of embodiments of the invention can be employed to form further embodiments.

The invention claimed is:

1. A method for depositing a metal-based coating on a particulate substrate, including:
   a) preparing a mixture comprising the particulate substrate; and a powder comprising a coating metal oxide of one or more of Ti, Al, Zn, In, Sb, Ag, Co, V, Ni, Cr, Mn, Fe, Cu, Pt, Pd, Ta, Zr, Nb, Rh, Ru, Mo, Os, Re and W; and a reducing agent powder of Al metal or Al alloy, and a powder of aluminium chloride; and
   b) mixing and heating the mixture to form a coating on the particulate substrate, to produce a coated substrate product.

2. A method according to claim 1, comprising the steps of:
   immersing a substrate powder in a reactant mixture comprising the coating metal oxide and the reducing agent powder and aluminium chloride and optionally one or more coating additives, and heating and mixing the reactant mixture at temperatures between 100° C. and 900° C. to induce reactions between a particulate substrate surface and the reactant mixture and form a coating on the particulate substrate; and
   condensing by-products away from a reaction zone where the reducing agent and reactant mixture are reacting; and
   separating the coated particulate substrate from residual un-reacted materials.

3. A method according to claim 2, wherein the coating additives include boron, carbon, oxygen or nitrogen and the coated substrate products comprises a substrate coated with metal borides, metal carbide, metal oxide or metal nitride.

4. A method according to claim 2, wherein the reducing agent is mixed or co-milled with $AlCl_3$ or the reducing agent is mixed or co-milled with the particulate substrate or a part of the particulate substrate.

5. A method according to claim 1, wherein the method includes the steps of condensing volatile by-products away from the mixture; and separating the coated substrate from residual un-reacted materials.

6. A method according to claim 1, wherein the method comprises the steps of:
reacting the mixture including the coating metal oxide and the aluminium chloride with the particulate substrate at temperatures below Tmax to form a coating on the particulate substrate surface; the coating comprising a metallic coating deposited on the particulate substrate surface and/or a metallic skin obtained by chemically incorporating metallic elements into the particulate substrate surface; and Tmax is below 900° C.; and
condensing by-products away from the mixture.

7. A method as claimed in claim 1, wherein reactions between the coating metal oxide and the reducing agent are exothermic.

8. A method as claimed in claim 1, wherein the particulate substrate is mixed and reacted with the aluminium chloride before mixing and heating with the coating metal oxide and the reducing agent powder.

9. A method as claimed in claim 1, wherein the particulate substrate is in the form of a powder, flakes, beads, or fibres comprising:
i.—pure metals or alloys and compounds based on metals and transition metals including one or more of alloys, oxides, nitrides, carbides, silicides and borides;
or
ii.—silica, glass, quartz, silicates, borosilicate, soda glass, silicon nitride, mica, talc, graphite carbon fibre or a mixture thereof.

10. A method according to claim 9, wherein the weight ratio of the coating metal oxide to the particulate substrate is between 0.01 and 5.

11. A method according to claim 9, wherein the particulate substrate includes silicon and the coating includes metal silicides.

12. A method according to claim 11, wherein the particulate substrate includes a borosilicate substrate or a soda-lime glass substrate and where Tmax is below 650° C.

13. A method according to claim 9, wherein the particulate substrate comprises one or more of carbon powder, carbon beads, carbon flakes, or carbon fibres.

14. A method according to claim 9, wherein the coating on the coated substrate product includes Al at levels between 0 wt % and 50 wt % and unreacted coating metal oxide.

15. A method according to claim 1, wherein the method is carried out at a pressure between 0.0001 bar and 1.1 bar.

16. A method according to claim 1, wherein the method includes an additional step of reacting the coated substrate product with a reactive gas including oxygen, nitrogen, carbon or boron.

17. A method according to claim 16, wherein the reactive gas includes a reactive element from the group of oxygen, nitrogen, carbon, and boron, and wherein a flow of the reactive gas is controlled to produce a coating with a controlled amount of the reactive element.

18. A method according to claim 1, wherein an amount of the coating metal oxide reduced by the reducing agent is between 5 wt % and 100 wt % of the coating metal oxide.

19. A method for depositing a metal-based coating on a particulate substrate, including:
a) heating a mixture comprising a particulate substrate and a mixture of a powder of aluminium chloride and a powder of aluminium;
b) adding to the heated mixture a powder comprising a coating metal oxide of one or more of Ti, Al, Zn, Sn, In, Sb, Ag, Co, V, Ni, Cr, Mn, Fe, Cu, Pt, Pd, Ta, Zr, Nb, Rh, Ru, Mo, Os, Re and W; and
c) mixing and further heating to form a coating on said particulate substrate.

20. A method for producing a metallic coating on a particulate substrate surface, and wherein the method is conducted stepwise:
in a first step, a coating metal oxide of one or more of Ti, Al, Zn, Sn, In, Sb, Ag, Co, V, Ni, Cr, Mn, Fe, Cu, Pt, Pd, Ta, Zr, Nb, Rh, Ru, Mo, Os, Re and W is reacted with other reactants comprising a powder of aluminium chloride at temperatures between 100° C. and 500° C. to form intermediates in a powder form; and
in a second step, a mixture comprising the intermediates, a reducing agent powder of Al metal or Al alloy and the particulate substrate is heated at temperatures between T2, above 300° C., and Tmax, below 900° C., to induce physical or chemical reactions between reactants in the mixture and cause a coating to form on the particulate substrate surface.

\* \* \* \* \*